United States Patent [19]
Gorgens et al.

[11] 3,742,233
[45] June 26, 1973

[54] MOTION DISPLACEMENT TRANSDUCER

[75] Inventors: Joseph E. Gorgens, Trumbull;
William A. Heske, Fairfield; Randall Goff, Weston, all of Conn.

[73] Assignee: Dresser Industries, Inc., Dallas, Tex.

[22] Filed: Aug. 20, 1971

[21] Appl. No.: 173,517

[52] U.S. Cl. .......... 250/231 R, 250/231 P, 250/209
[51] Int. Cl. ............................................. G01d 5/34
[58] Field of Search............ 250/231, 231 P, 220 M, 250/208, 209, 229, 217 SS

[56] References Cited
UNITED STATES PATENTS

| | | | |
|---|---|---|---|
| 3,550,878 | 12/1970 | Crisp | 250/219 X L |
| 3,651,509 | 3/1972 | Ngo | 250/217 X SS |
| 3,551,682 | 12/1970 | Kerhoas | 250/217 X SS |
| 3,590,261 | 6/1971 | Snook | 250/231 R |
| 3,479,517 | 11/1969 | Bray et al. | 250/217 X SS |
| 2,319,406 | 5/1943 | Jones | 250/231 X |

*Primary Examiner*—Walter Stolwein
*Attorney*—Robert W. Mayer, Daniel Rubin et al.

[57] ABSTRACT

A transducer for converting motion displacement into a digital electrical signal. A radiation impervious vane or shield member secured to a motion producing device moves conjointly therewith in a motion path extending intermediate a predetermined radiation sensitive or emitting array pattern and a radiation source or sensor. Movement of the vane acts to interrupt the light beam between the source and sensor and the extent to which the beam is interrupted is a measured function of vane displacement. Continual updated logic count analysis of the array units interrupted by vane position produces an electrical digital output signal for remote utilization in correspondence to the logic count.

18 Claims, 14 Drawing Figures

RANDALL GOFF
WILLIAM A. HESKE
JOSEPH E. GORGENS
INVENTORS

BY
ATTORNEY

RANDALL GOFF
WILLIAM A. HESKE
JOSEPH E. GORGENS
INVENTORS

BY Daniel Rubin
ATTORNEY

RANDALL GOFF
WILLIAM A. HESKE
JOSEPH E. GORGENS
INVENTORS

BY Daniel Rubin
ATTORNEY

MOTION DISPLACEMENT TRANSDUCER

BACKGROUND OF THE INVENTION

The field of art to which the invention pertains includes the art of measuring and testing as adapted for providing a digital output signal corresponding to a measured motion displacement of a motion producing device.

Instrumentation capable of converting or transducing motion displacement into intelligently useful data are widely used in an endless number of applications. Typically, for example, a weight scale will transduce a weight induced motion into a readout display of weight units; the Bourdon tube in a pressure gauge will transduce pressure induced tube deflection into a readout display of pressure units; a motion form of thermometer will similarly transduce temperature rendered motion into a display of temperature units; etc. These prior systems are frequently adapted for signal outputs other than visual display, but when used for the latter employ a pointer or the like movable relative to a fixed graduated dial of units being measured. As such, these prior units are "open looped", i.e., provide readout as a direct measurement of motion displacement whether linear or otherwise.

Where adapted to provide a form of digital output signal, it is common to use a force balance system in which digital signal generation is associated with a feedback mechanism operable in conjunction with an open loop motion displacement. Apparatus embodying this latter type system usually includes a complexity of mechanical components operating a counter, encoder or the like for emitting and/or displaying a digital signal of values corresponding to motion displacement of the phenomena being measured. By virtue of their construction, these prior force balance systems are characteristically subject to the common problems of inertia, matching, mass, etc., not to mention a relatively high manufacturing cost as compared to the open loop type system. Despite recognition of the limitations imposed by the force balance system for effecting digital output, it has not been known heretofore how to provide an accurate digital output signal based directly on induced motion displacement of an open loop type device. A form of direct measurement not associated with open loop type devices is disclosed in patent U.S. Pat. No. 3,428,817.

SUMMARY

The invention relates to a motion displacement transducer for converting induced motion displacement directly into a digital electrical signal. Since the transducer hereof is directly responsive, it is compatible for use with any type motion producing device apparatus, open loop or otherwise. Input to the transducer can be provided without necessity of a feedback system as to eliminate all the mechanical complexities and problems attendant with such prior systems. By means of the transducer of the invention, these results are achieved by attaching a light blocking vane to a device which is motion producing in response to changes in its measured variable. Vane motion is effected conjointly with the device in a motion path defined between a light source or sensor and a prearranged light sensitive or emitting units of an array pattern. The number of array units unaffected (or affected) by the vane is proportional to the vane position and its displacement and hence to the process variable. Electrical logic is provided to continuously scan the array and count the number of unaffected (or affected) array units. The count is updated with each scan and based on which an electrical signal is provided to output terminals in BCD, natural binary, or other digital code for utilization as desired. For display, the output signal is supplied to a display apparatus commercially available for that purpose including for example integrated circuit decoder drivers, cold cathode display tubes, light emitting diode numeral matrices, etc.

It is therefore an object of the invention to provide a novel motion displacement transducer capable of converting input motion directly into a digiral electric signal.

It is a further object of the invention to provide a novel motion transducer as in the last recited object readily adaptable for use with any motion producing device without dependency on a force balance structure in the manner of such similar purpose transducers of the prior art.

It is a further object of the invention to provide a novel digital signal motion transducer readily usable with open loop measuring devices which provide direct motion displacement in correlated response to sensed changes of a variable condition.

It is a further object of the invention to provide a novel digital signal motion transducer that substantially if not completely eliminiates the mechanical complexity and inertia problems associated with such similar purpose transducers of the prior art as to enable highly accurate cmomparatively low cost manufacture of such transducers.

It is a further object of the invention, to provide a transducer as in the last mentioned object which is operative without need for physical contact with the motion producing element.

It is a still further object of the invention to provide a novel digital signal motion displacement transducer as in the aforementioned objects that is capable of providing digital data in suitable signal form as either a direct or variable function of the displacement to which the output signal is correlated.

BRIEF DESCRIPTION OF THE DRAWINGS

FIGS. 1(A), (B), (C), and (D) are exemplary forms of motion producing devices utilizing a first embodiment of the invention;

FIGS. 3(A), (B), and (C), are typically optional array patterns as can be used herein;

Figures 1A, 1B, 1C, 1D:
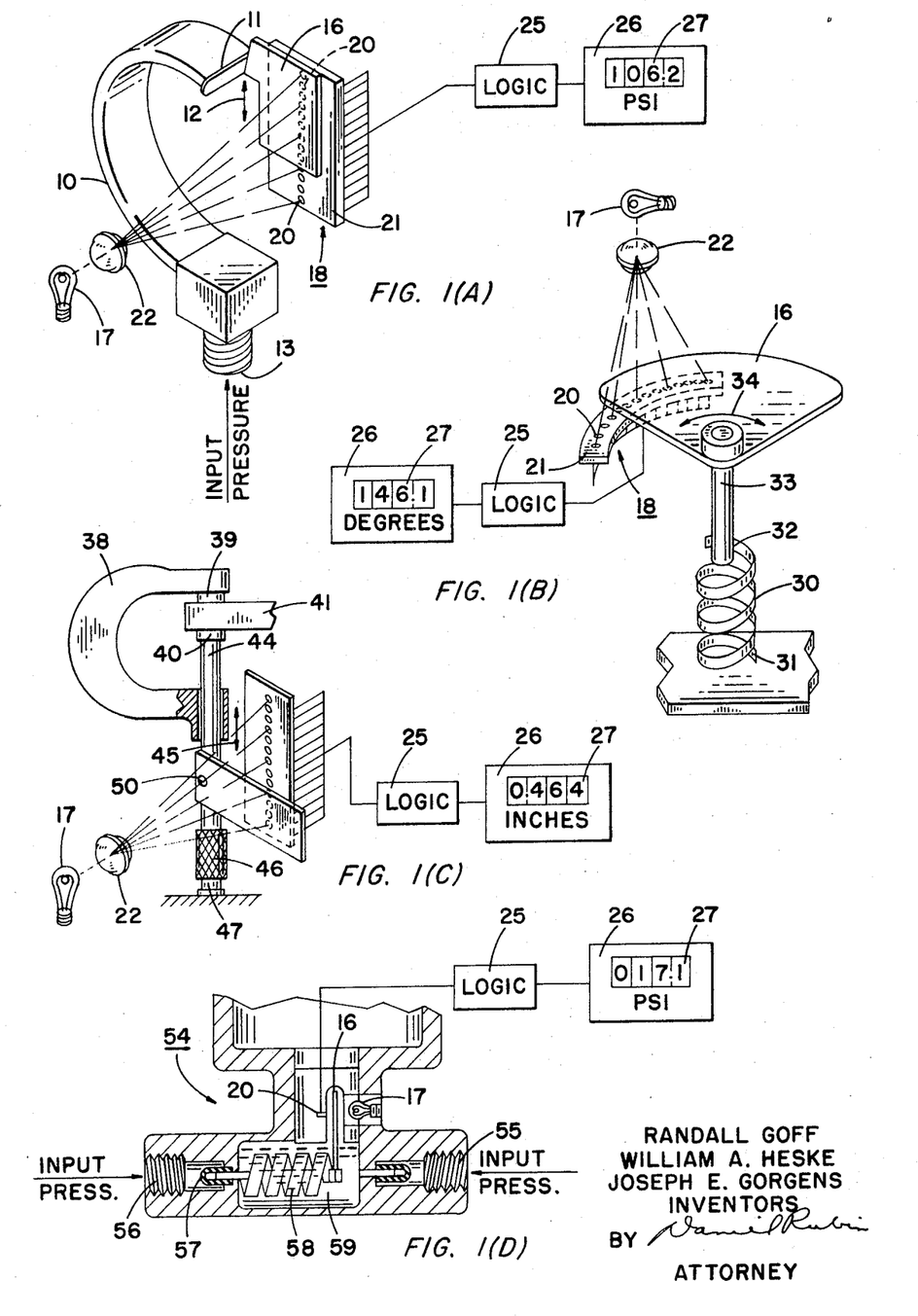

Reference is now made to the drawings and particularly to the various illustrations of FIG. 1 disclosing exemplary motion producing devices in their simplest form with which the invention hereof in its first embodiment is utilized. In FIG. 1(A) there is shown a Bourdon tube 10 having a free end 11 which displaces in the direction of arrow 12 in response to variable pressure supplied to inlet 13. Secured to free end 11 is a radiation impervious, rectangular shaped, lightweight vane 16 movable conjointly with end 11 in a motion path defined intermediate radiation emitting source 17 and a radiation sensitive sensor array generally designated 18. Radiation emanating from source 17, preferably in the form of infrared, is projected via lens 22 onto individual sensor elements 20 of sensor array 18. Sensor array 18, as will be more fully described below, comprises an array pattern of individual units which for this embodiment consist of individual photo sensor elements 20. The elements are secured in a base 21 and arranged in a predetermined pattern correlated and in plane generally parallel to the displacement path of vane 16.

As illustrated in this embodiment, the pattern of sensor units 20 is linear to accommodate linear motion of vane 16 which in displacement acts to block or interrupt radiation from source 17 to more or less of the individual sensors. As specifically illustrated, those sensors 20 shown solid are receiving illumination (ON) whereas those shown dashed are unilluminated (OFF) by virtue of blockage imposed by the intervening vane. As will be understood, the quantity of ON (or OFF) sensors linearly corresponds to vane displacement, and hence to its measured variable.

Logic 25, as will be more fully explained, operates to continuously scan sensor units 20 for effecting an updated count whereby to determine the exact quantity of ON (and/or OFF) units. From the count determination, logic 25 emits an electrical digital output signal for remote utilization in the form required, and which for convenience of disclosure is illustrated here as a display unit 26 indicating unit values 27 representative of the measured pressure variable.

Referring now to FIG. 1(B) there is disclosed a spiral, bi-metallic thermometer coil 30 secured at end 31 and adapted to wind and unwind opposite free end 32 in response to temperature changes of the temperature condition being measured. A shaft 33, secured to free end 32, transmits the winding and unwinding movement thereof in an arcuate path represented by arrow 34 to circular segment vane 16 otherwise similar to vane 16 previously described. For these purposes, sensor array 18 is shaped as a circular segment in correspondence with the vane shape and similarly contains individual sensor units 20 which receive emitted radiation from source 17. The radiation is in turn blocked or interrupted in part by vane 16 displaced in its motion path by operational sensitivity of coil 30. Thereafter logic 25 on determination of its sensor unit count emits an electrical digital output signal similarly as before to display unit 26 providing visual temperature values 27 in digital form corresponding to the temperature of the condition being measured.

In the illustration of FIG. 1(C) there is shown another type of motion producing element with which the transducer hereof is operative in the form of a micrometer 38 having a stationary jaw 39 and a movable jaw 40 between which to secure a test piece 41 for linear dimension to be determined. Jaw 40 is secured to the end of shaft 44 linearly and non-rotatably movable in the direction of arrows 45 as controlled by a knurled knob 46 and secured at its lower end 47. A vane 16 is attached to shaft 44 by means of a screw 50 for conjoint movement therewith in a linear motion path defined intermediate light source 17 and sensor array 18 to effect operation of logic 25 similarly as before.

In the illustration of FIG. 1(D) similar motion is likewise effected via a differential pressure unit 54 receiving a first pressure at inlet 55 and a second pressure at inlet 56. Pressure received at the former is transmitted through intervening seal 57 to a fluid 58 contained in a sealed chamber 59. Pressure received at inlet 56 is likewise conducted through a seal 57 to a spiral wound Bourdon tube 62 immersed in fluid 58 and the free end of which contains a circular segmental vane 16. The motion path of vane 16 is perpendicular to the illustrated plane between light source 17 and sensor array 18 for operation similarly as above.

Figure 2:
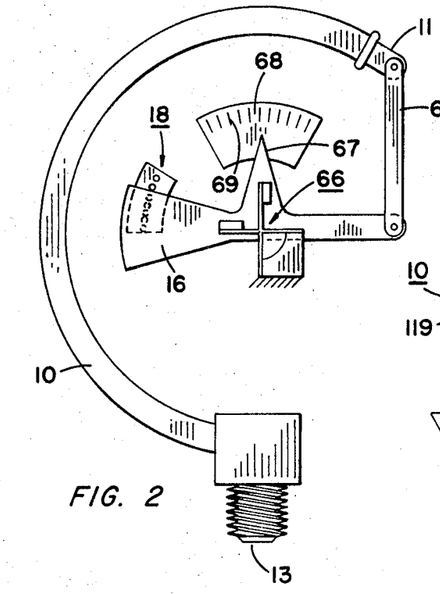
FIG. 2 illustrates a pressure gauge incorporating the first embodiment of the invention.

Referring now to FIG. 2, there is shown a form of pressure gauge in which the displacement motion of free end 11 of Bourdon tube 10 is transmitted through a linkage 65 operable through cross flexure bearings 66 to produce arcuate motion of vane 16. As before, the motion path of vane 16 is intermediate a light source (not shown) and sensor array 18 such that via logic 25 (not shown) effects the appropriate digital output signal for remote utilization as required. Local indication of pressure values is provided by a pointer 67 movable with the vane relative to a dial 68 having pressure unit graduations 69.

Figures 3, 6:
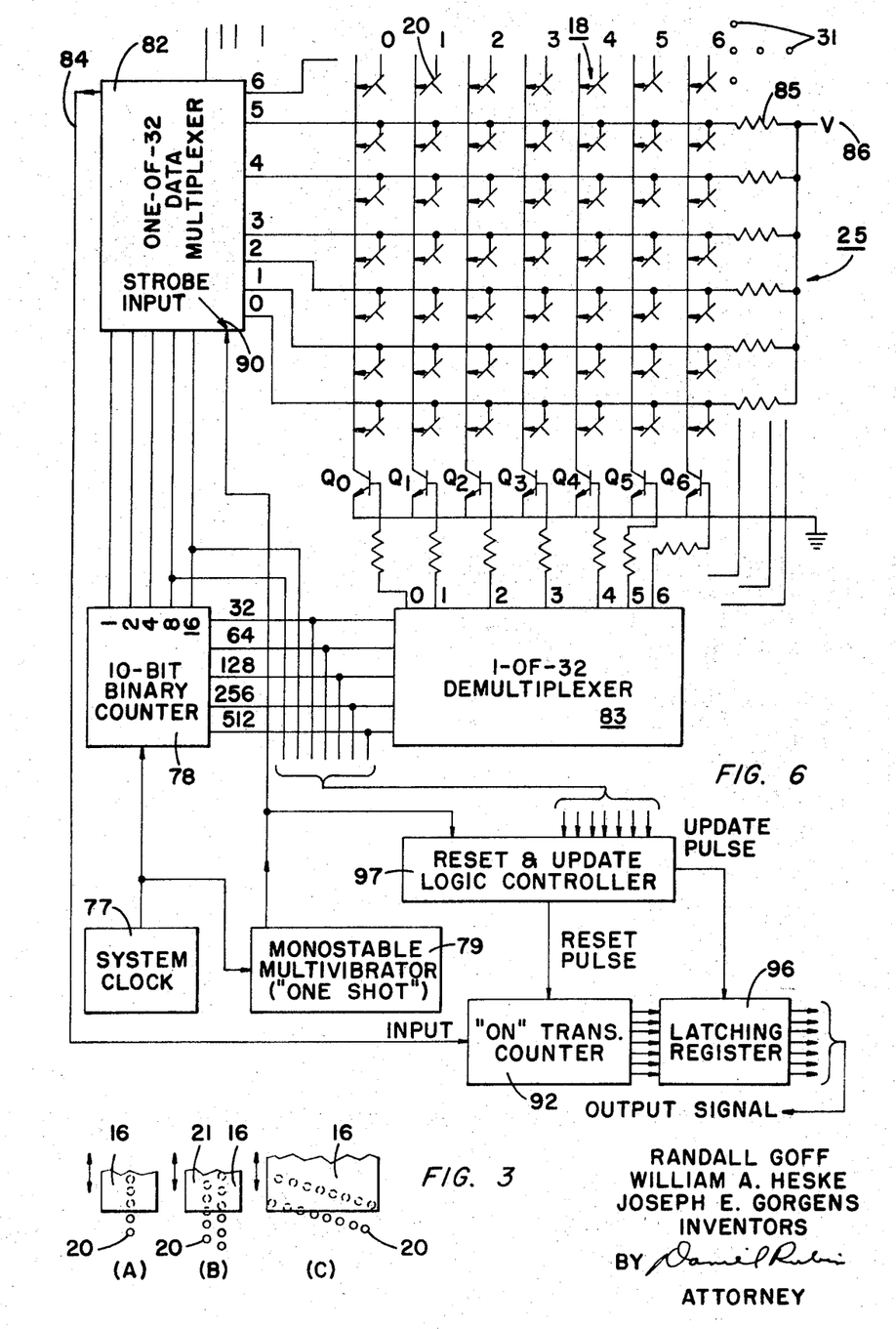
FIG. 6 is a schematic electrical logic diagram applicable to the previous figures and partially in block form for effecting the digital output signal in accordance herewith.
Figures 4, 8:
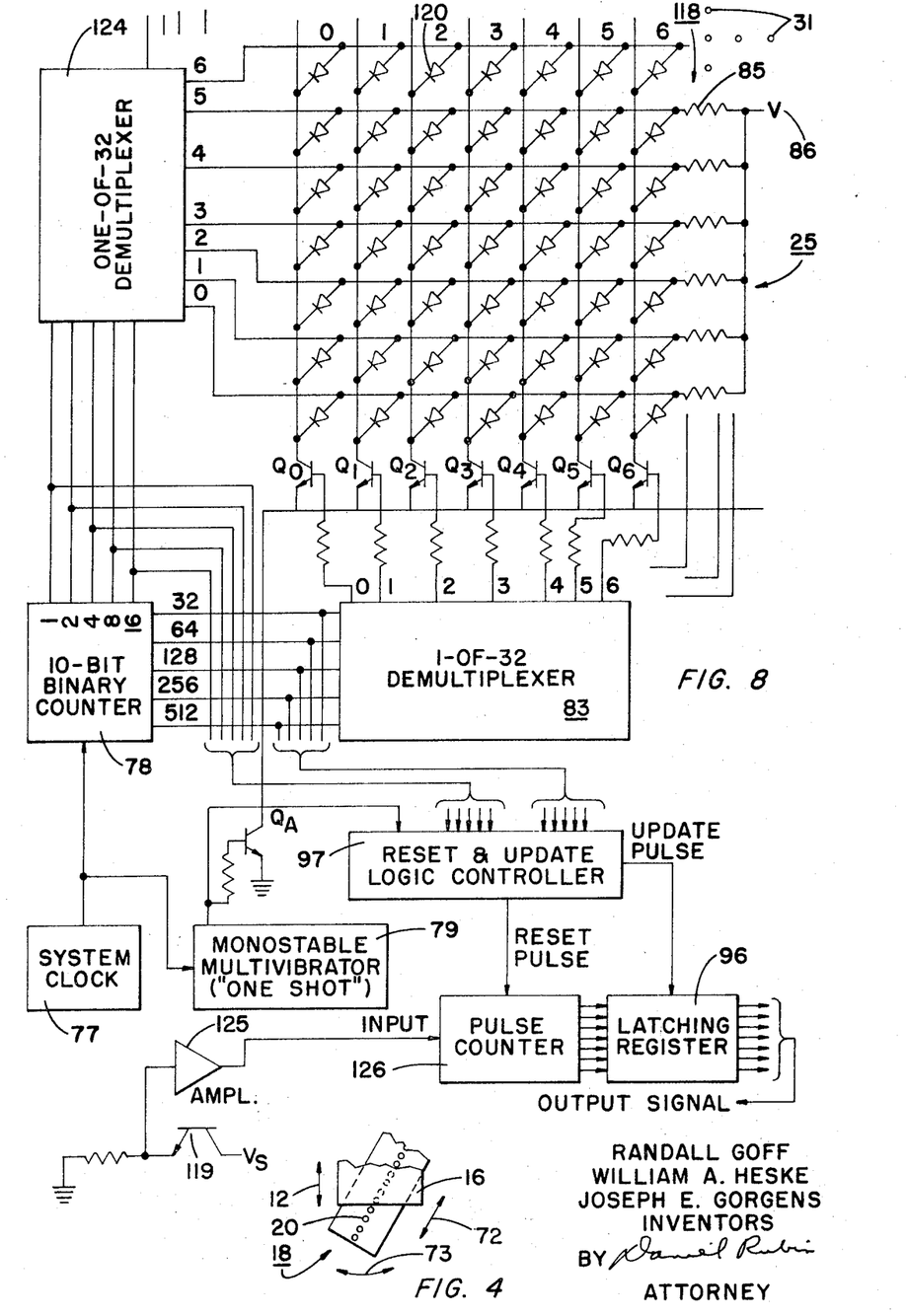
FIG. 4 geometrically illustrates the manner of effecting zero and/or span adjustment of the pressure gauge of FIG. 1(A)
FIG. 8 is a schematic electrical logic diagram applicable to a third embodiment of the invention.

FIG. 3 illustrates exemplary array patterns of sensor units 20 relative to the motion path of vane 16, and FIG. 4 illustrates the manner of obtaining relative zero and span adjustment therebetween. In FIG. 3(A) sensor units 20 are in a straight line, spaced-apart arrangement coaligned with the motion path of vane 16 whereas in FIG. 3(B) they are likewise spaced and aligned but in parallel straight line rows with the units of one row being linearly intermediate with respect to units of the other row. FIG. 3(C) units 20 are likewise spaced-apart in straight line parallel rows but are angularly skewed relative to the motion path of vane 16. The skew angle should enable sequential operation by preventing more than one sensor unit at a time from changing from dark to light and vice versa. Each of the latter patterns afford increasingly closer spacings and consequent higher resolution while facilitating manufacture of the electrical connections during assembly.

With particular reference to FIG. 4 it can be seen how the zero and span adjustments are readily obtained. To effect the zero adjustment it is only necessary that sensor array 18 be initially moved linearly in the direction of arrow 72 until a zero output logic signal is effected whereas span adjustment is obtained by rotating array 18 in the arcuate direction of arrow 73 so that radiation to more or less units 20 is interrupted for a given motion of vane 16.

It should be readily recognized that any suitable geometric pattern of sensor units 18 can be employed, compatible with the motion producing device with which it is utilized. It is important only that the sensor pattern readily accommodate sequential unit exposure to provided radiation as a function of induced motion displacement with which it is intended to cooperate. Somewhat dictating unit spacing is the physical limitation imposed by the choice of sensor type which for purposes hereof can comprise any well known form of photosensitive device. This is intended to include without limitation photo-transistors, photo-diodes, photo-field effect transistors, or any photo-conductive or photo-voltaic device capable of being fabricated in a closely spaced array. Likewise these arrays can be formed and increasingly compacted by well-known integrated circuit techniques whereby a highly concentrated number of sensor units per given area can be provided. Radiation wave lengths of peak sensor sensitivity can likewise vary widely as a function of sensor choice, as for example, within sensitivity ranges from the ultraviolet through the visible into the infrared region.

Figure 5:
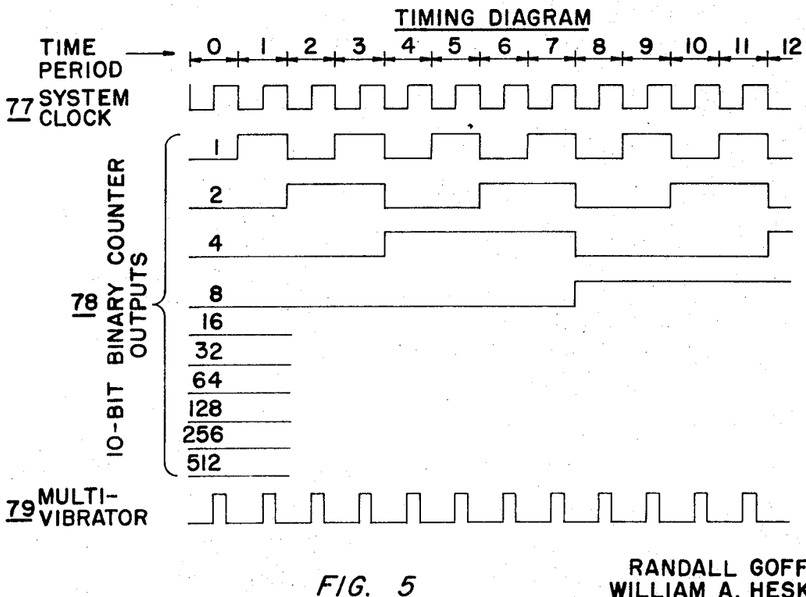
FIG. 5 is a logic timing diagram applicable to the previous figures.

An understanding of logic 25 will now be provided with particular reference to FIGS. 5 and 6 and which for purposes of explanation sensor array 18 is represented by individual photo-transistor sensor units 20 in a 32 by 32 matrix array providing 1,024 sensors. Each of the system components represent items which are individually available from commercial sources and are not per se regarded within the scope of the invention hereof. Moreover, in the preferred manner of this embodiment, logic 25 is adapted for scanning and counting "ON" sensors although it should be recognized that a similar result can be obtained by counting "OFF" sensors instead.

In order to effect the aforesaid scanning and counting, logic 25 includes a system clock 77 producing a square wave output selected having an upper frequency compatible with the wave response of sensor units 20. Each clock pulse represents an interrogation of the condition state of any one sensor unit 20 i.e., whether ON or OFF. Typically, a clock frequency usable with photo-transistor type sensors 20 is on the order of 10 KHZ such that a 32 by 32 array is completely scanned approximately ten times per second. Depending on the sensor mode of operation and its dynamic characteristics, scan frequencyies of several MHZ are possible. Sensor interrogation is controlled by a 10 bit (1,024 count) binary ripple counter 78 whose input comprises the pulse train output of clock 77 simultaneously furnished to a monostable multivibrator 79. The multivibrator in turn emits a short, one shot pulse time related to each leading edge of the received clock pulse.

From binary counter 78, the five least significant output bits (LSB's) which, in a binary count of from 0 to 1,024 produces a sequence of 32 numbers from 0 to 31 repeated 32 times, are fed to a one of - 32 data multiplexer 82. At the same time, the five most significant bits (MSB's) are furnished to a one of thirty two demultiplexer 83 and act to maintain numerical cycle count of the LSB's between 0 and 31.

Demultiplexer 83 likewise has 32 output lines one of which is energized as determined by the binary number appearing at its input. Each of the 32 output lines controls a transistor Qo, Q1, Q2, Q3,-Q31 which when energized connects its respective one of the 32 vertical buses (as illustrated) to ground potential. Each of the vertical buses is in turn connected to the emitter lead of 32 photo-transistor sensor units 20 such that when a binary number appears at demultiplexer 83 e.g., 00001, the 1 column switches to ground potential grounding all 32 sensors 20 connected to that bus. Meanwhile, the MSB's state remains constant until the LSB's supplied numbers to multiplxer 82 from 0 to 31 has been completed.

The thirty two horizontal buses (as illustrated) are each connected through a suitable resistor 85 to voltage source 86 and to the collector leads of photo-transistor sensors 20 for supplying input to multiplexer 82. Since at any given time only one vertical bus is grounded, only those sensors 20 whose emitters are grounded can cause its collector connected horizontal bus to be at or near ground potential. Consequently, an illuminated ON sensor 20 places its collector connected horizontal bus to near ground potential whereas an unilluminated OFF sensor 20 enables its collector connected horizontal bus to remain at or near supply voltage from source 86. On determination of the condition state of each sensor collector, multiplexer 82 will, at that point, a strobe input 90 is energized sequentially transfer the determined sensor states along the vertical grounded bus to its output 84. By this means, as counter 78 advances from 0 to 1,024 the vertical buses are sequentially scanned and the sensor state in each bus is produced onto multiplexer output 84.

From the timing diagram of FIG. 5 it can be seen that counter 78 changes state on the negative going side of the pulse train produced by clock 77 and that the positive going side occurs in the middle of the clock period. Moreover it is to be noted that multivibrator 79 produces its one shot strobe pulse 90 in the middle of the clock period in order to avoid erroneous data which could otherwise occur if pulsed while tbe vertical buses are switching.

So long as strobe input 90 is not energized, output 84 remains at a binary "1" regardless of the state of the 32 input lines. When an OFF phototransistor 20 (1 at its horizontal bus) is encountered, and the 1 is transferred to output 84 by strobe 90, output 84 remains unchanged since its state was already at a 1 with the strobe de-energized. However, if a binary 0 for an ON sensor is encountered at one of the 32 input buses, and strobe 90 is energized, a negative going pulse equal to the duration of the strobe pulse occurs at output 84.

Pulses at output 84 are supplied to and counted by "on" phototransistor counter 92 capable of producing a BCD, binary or other desired digital coded output. Once counter 78 has counted full scale to 999, the remaining 24 clock periods of the original 1024 provide overrange capability serving to transfer counter 92 output to latching register 96 and then reset counter 92 to zero for the next scan sequence. Reset and update logic controller 97 effects transfer of the correct control pulses at designated clock periods between 999 and 1023 to counter 92 and latching register 96 from which the appropriate digital output signal is emitted for supplied utilization as desired.

Reference is now made to FIGS. 1–5 and 7 for a description of a second embodiment of the invention in accordance herewith. Unlike the previous embodiment in which emitter radiation source 17 remained constantly ON in this embodiment source 17 comprises a light emitting diode (L.E.D.) which is pulsed by logic 25 reading the exposed sensor elements 20. Emitter control is transferred sequentially between sensors 20 until encountering a sensor located in the shadow of vane 16. Emitter pulses are counted to determine the number of motion increments to reach the edge of vane 16. Preferably, at least two OFF sensors are required to be encountered in sequence to ensure against a false count from failure of an individual sensor.

Figure 7:
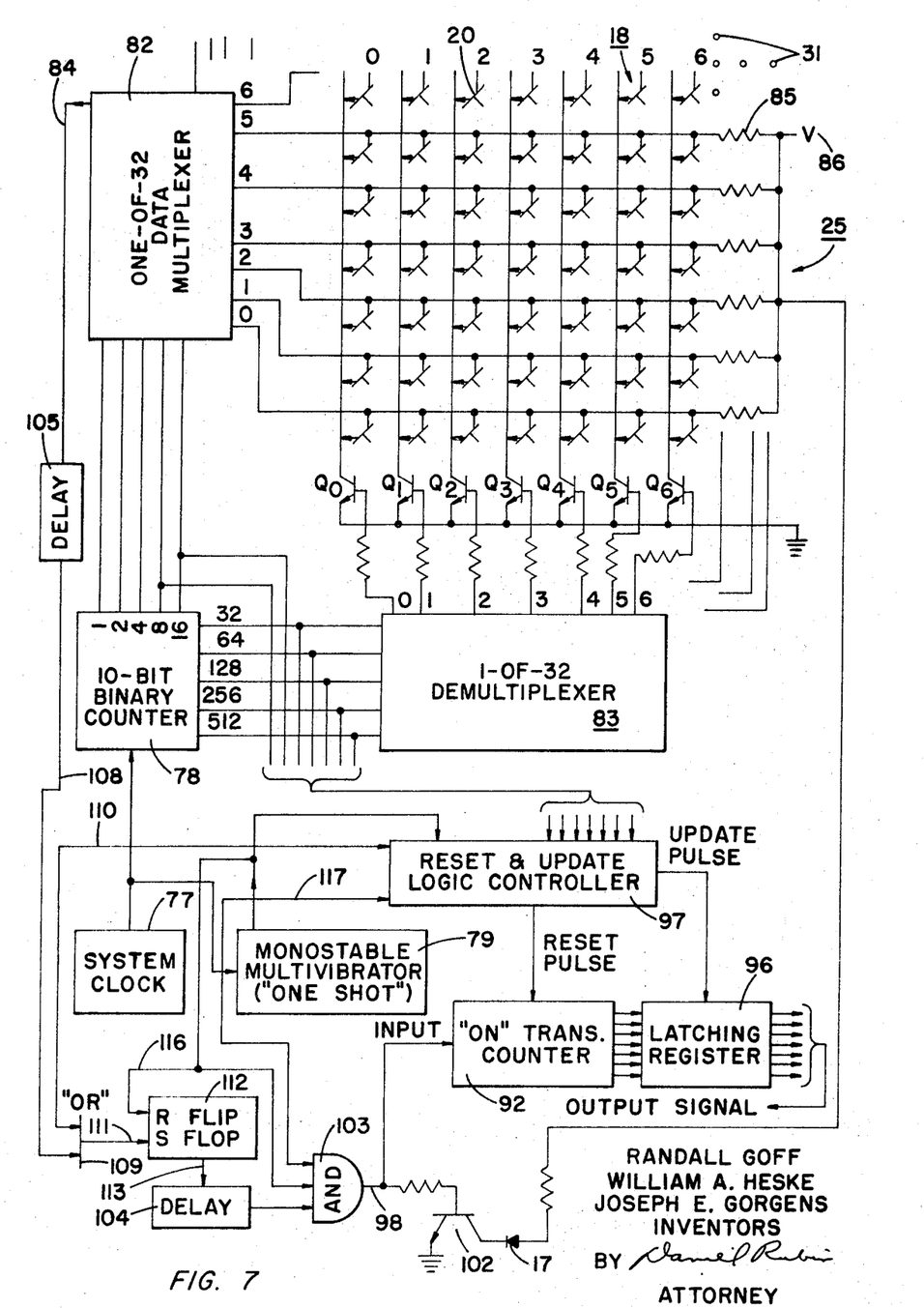
FIG. 7 is a schematic electrical logic diagram applicable to a second embodiment of the invention.

Scanning of the photosensor array 18 corresponds to the previous description in that, while the array is being interrogated, multiplexer 82 and demultiplexer 83 determine as a function of the binary signals emitted from counter 78. L.E.D. source 17 is pulsed or actuated only after interrogation of an ON sensor element 20. Following each pulse logic 25 requires a return pulse confirming that the previously determined ON sensor was exposed thereby assuring subsequent pulsing for the next sensor to be interrogated.

Operation in accordance with this embodiment can be best understood with specific reference to FIG. 7. Transistor 102 controls L.E.D. light source 17 as a function of the output 98 from AND gate 103 applied to its base resistor. Inputs to AND gate 103 are received from multivibrator 79, controller 97 and delay 104 all of which must be at binary 1 for effecting binary 1 at output 98.

On encountering an ON sensor 20, multiplexer 82 emits a signal on output 84 for supply to delay 105. Delay output signal 108 comprises one input to OR gate 109 the other of which is furnished from controller output 110. OR gate output 111 is supplied to S terminal of flip-flop 112 and comprises a binary 0 if both inputs are at 0 and comprises a binary 1 if either or both inputs are at 1. Flip-flop output 113 is set to 1 by a 1 input 111 and an absence of the latter (OFF sensor 20) enables a 1 on line 116 at input R to effect a 0 output 113. A 0 output from delay 104 will then inhibit a pulsing from AND gate 103 to L.E.D. source 17 for the subsequent clock period. On the otherhand, a 1 output from delay 104 is effective during the next clock period, on receipt of a pulse from multivibrator 79, to again actuate L.E.D. 17. Pulsing of L.E.D. 17 continues until an OFF sensor 20 is encountered producing the aforementioned 0 on the output of delay 104.

AND gate output 98 is also fed to the input of counter 92 which counts the number of pulses produced at L.E.D. 17. The number of L.E.D. pulses accumulated in counter 92 for a given scan over the entire array 18 represents a measure of the position of the interface between dark and light sensors 20. Although the L.E.D. is prevented from pulsing after the light/dark interface is reached, the scanning of the array continues until completed. Of a possible 1024 positions in the array the first 1020 phototransistors are made potentially active and the remaining four are omitted or kept dark to never sense the presence of light. The outputs from counter 78 are fed to the reset and update logic controller 97 which serves to produce the proper control pulses at given times. In the 1021 clock period, the accumulated counter count is transferred to latching register 96 by the presence of the update pulse. In the 1022 period counter 78 feeding the latching register is reset to zero by the reset pulse for the next scan sequence. Output 117 of update logic controller 97 will switch from a 1 to a 0 for the remaining count to 1024, thus preventing any pulses from occuring on 98 until beginning the next scan. At the end of the 1024th clock period line 110 produces a pulse to set 113 output of the flip-flop to 1. The system is then ready for the next complete scan of the sensor array.

Figure 9:
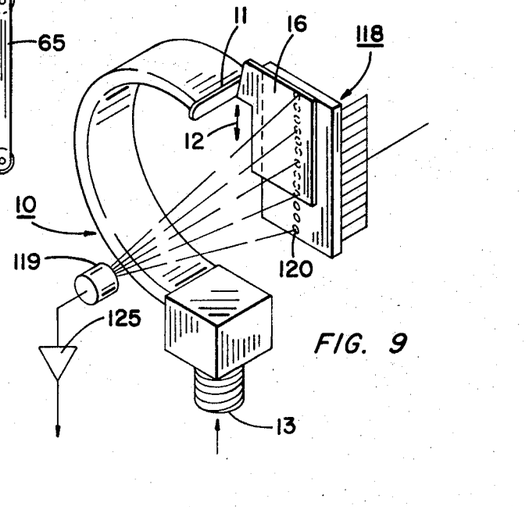
FIG. 9 is similar to FIG. 1(A) exemplifying the third embodiment of the FIG. 8.

The third embodiment of the invention will now be described with reference to FIGS. 8 and 9. For purposes of disclosure there is shown a Bourdon tube 10 with an attached vane or shield 16 operable in a manner analogous to FIG. 1(A). Unlike the previous embodiments, however, this embodiment contemplates use of an emitter array 118 having a predetermined pattern of individual radiation emitter elements 120 for actuating a single highly sensitive sensor 119. Individual elements 120, which preferably comprise light emitting diodes (L.E.D.), are secured in a base 121 in a pattern arranged similar to those previously described relative to the motion path of vane 16. In each cycle of this embodiment, each L.E.D. 120 in a scanning sequence emits a radiation pulse for transmission to sensor 119. The number of such pulses received by the sensor is a function of vane position acting to interrupt or shield the sensor from some of the emitted pulses. Logic 25 therefore effects counting of the pulses and updating of the counter with each sweep of the array to provide a digital output of vane position similarly as before.

With specific reference to FIG. 8, clock 77 again produces a continuous train of evenly spaced pulses into ten bit binary counter 78 capable of counting to 1024. The 1 through 16 bit counter outputs connect to demultiplexer 124 which, in effect, decodes the digital output of these bits and energizes the appropriate horizontal lead (as illustrated) through array 118. In a similar fashion, the 32 through 512 counter output bits are connected to second demultiplexer 83 whose output in turn switches transistors Qo –Q6 controlling the vertical columns (as illustrated) of the array. As clock pulses enter binary counter 78, the array is swept down the bus columns in sequence until all elements 120 of the array have been pulsed. Sensor 119 detects the pulses from those emitters exposed by the vane position. Sensor output is supplied to amplifier 125 which feeds the amplified pulse to a pulse counter 126 which in turn feeds output register 96. When maximum count is reached in counter 78, the reset and update logic controller 97 functions to transfer the output of counter 126 into output register 96 and reset the pulse counter prior to starting the next sweep of the array. During the sweep, the previous sweep pulse count reading is held in latching output register 96 and its output is a binary number representative of the number of pulses sensed on the previous cycle, and hence, of the process variable.

By the above description there has been disclosed a novel motion transducer capable of readily converting displacement motion into a digital electrical signal for remote utilization. By virtue of its adaptation to virtually any form of displacement motion, the transducer hereof can readily be employed in conjunction with common open loop type condition sensitive devices from which digital outputs are desired and with which such similar purpose transducers of the prior art are unable to be used. Consequently, the motion transducer hereof fulfills a long felt need in providing a highly accurate motion sensitive device readily manufactured at a cost comparatively lower than such similar purpose transducers of the prior art. By appropriate logic, any desired output signal can be provided correlated as a direct function of displacement afforded by the motion producing device. The output signal need not bear a direct linear relation to the produced motion but can be readily adapted to produce any desired relation therebetween as for example square root extraction, flow measurement, etc. By means of a full array sweep on each cycle, regardless of whether the unit elements are ON or OFF a single sensor failure would produce error in output on the order of about one-tenth percent of full scale whereas a similar failure in a prior type similar purpose shaft encoder could result in total loss of data. Moreover, with the second disclosed embodiment the light source can be pulsed at extremely high currents for very short periods of time thus producing reasonably high signal levels at the phototransistor outputs. Consequently, the advantages afforded hereby are clearly unknown and nonexistent in association with such similar purpose transducers of the prior art. Whereas a square matrix has been illustrated for purposes of describing the arrays hereof, it is to be understood of course that this particular pattern was employed for the purposes of explanation and that any desired pattern can be employed for achieving the results hereof.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A motion displacement transducer for converting displacement motion into an electrical digital output signal comprising in combination:
   a. an emitting source of radiant energy;
   b. sensing means adapted to receive radiation from said source and to emit a discrete electrical signal in response to radiation received;
   c. one of said source or said sensing means comprising an element array arranged in a predetermined geometric pattern;
   d. a motion producing means adapted for displacement motion within predetermined distance limits;
   e. a member impervious to radiation from said source and connected to said motion producing means for conjoint movement therewith; said member being movable in a motion path intermediate said element sensing means and said source for consecutively interrupting radiation therebetween with changing quantities of said elements; and
   f. logic means to continuously time scan the elements of said array in sequence to obtain a count determination of the number of said elements with which transmission of radiation is being conducted between said source and said sensing means and to electrically emit a ditial output signal correlated to said determination.

2. A motion displacement transducer according to claim 1 in which said element array comprises said radiation source.

3. A motion displacement transducer according to claim 1 in which said element array comprises said sensing means including a plurality of photosensitive elements.

4. A motion displacement transducer according to claim 3 in which said radiation source is adapted for pulsed operation.

5. A motion displacement transducer according to claim 1 in which said motion producing means comprises apparatus means operatively sensitive to condition variables for bidirectional motion displacement in response to sensed condition changes.

6. A motion displacement transducer according to claim 5 in which said apparatus means is responsively operative to sensed changes in pressure.

7. A motion displacement transducer according to claim 6 in which said apparatus means comprises a Bourdon tube.

8. A motion displacement transducer according to claim 5 in which said apparatus is responsively operative to sensed changes in temperature.

9. A motion displacement transducer according to claim 8 in which said apparatus means comprises a bimetal coil.

10. A motion displacement transducer for converting displacement motion into an electrical digital output signal comprising in combination:
   a. motion producing means adapted for displacement motion within predetermined distance limits;
   b. a radiation impervious member secured to said motion producing means for conjoint movement therewith in a defined motion path;
   c. an element array arranged in a predetermined geometric pattern and positioned on one side of said motion path generally overextending at least one travel limit thereof;
   d. operative means positioned on the other side of said motion path generally opposite said array adapted for operative cooperation therewith;
   e. one of said operative means or the elements of said array comprising an emitting source of radiant energy capable of being transmitted across said motion path to the other and said other comprising sensing means operatively sensitive to radiation received from said source for said member in the course of its movement to consecutively interrupt radiation between changing quantities of the elements of said array; and
   f. logic means to continuously time scan the elements of said array in sequence to obtain a count determination of the number of said elements with which transmission of radiation is being conducted with said operative means and to electrically emit a digital output signal correlated to said determination.

11. A motion displacement transducer according to claim 10 in which said array elements comprise said radiation source.

12. A motion displacement transducer according to claim 10 in which said operative means comprises said radiation source.

13. A motion displacement transducer according to claim 12 in which said operative means comprises a pulsed radiation emitting source.

14. A motion displacement transducer according to claim 10 in which said motion producing means comprises apparatus means operatively sensitive to condition variables for bidirectional motion displacement in response to sensed condition changes.

15. A motion displacement transducer according to claim 14 in which said apparatus means is responsively operative to sensed changes in pressure.

16. A motion displacement transducer according to claim 15 in which said apparatus means comprises a Bourdon tube.

17. A motion displacement transducer according to claim 14 in which said apparatus is responsively operative to sensed changes in temperature.

18. A motion displacement transducer according to claim 17 in which said apparatus means comprises a bimetal coil.

* * * * *